3 Sheets—Sheet 1.

J. WHYSALL, Jr., & C. M. MERRICK.
Machine for the Manufacture of Horseshoe Nails.

No. 209,845. Patented Nov. 12, 1878.

Attest:
F. Benjamin
E. A. Welsh

Inventor Job Whysall Jr.
C. M. Merrick
By their attorney
C. E. Foster

N. PETERS, PHOTO-LITHOGRAPHER, WASHINGTON, D. C.

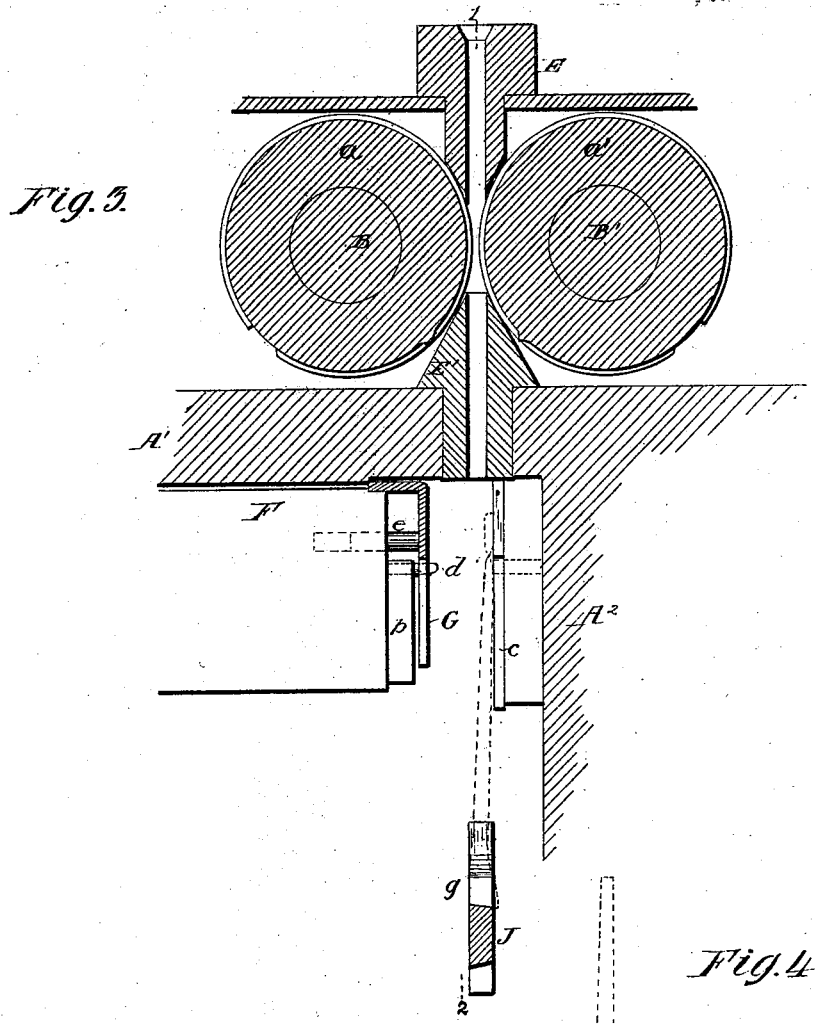
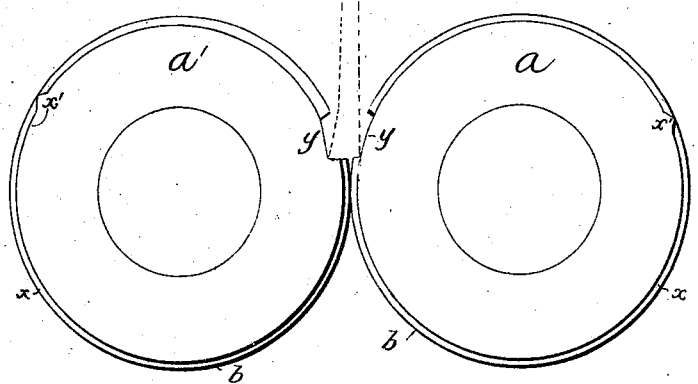

3 Sheets—Sheet 3.
J. WHYSALL, Jr., & C. M. MERRICK.
Machine for the Manufacture of Horseshoe Nails.
No. 209,845. Patented Nov. 12, 1878.
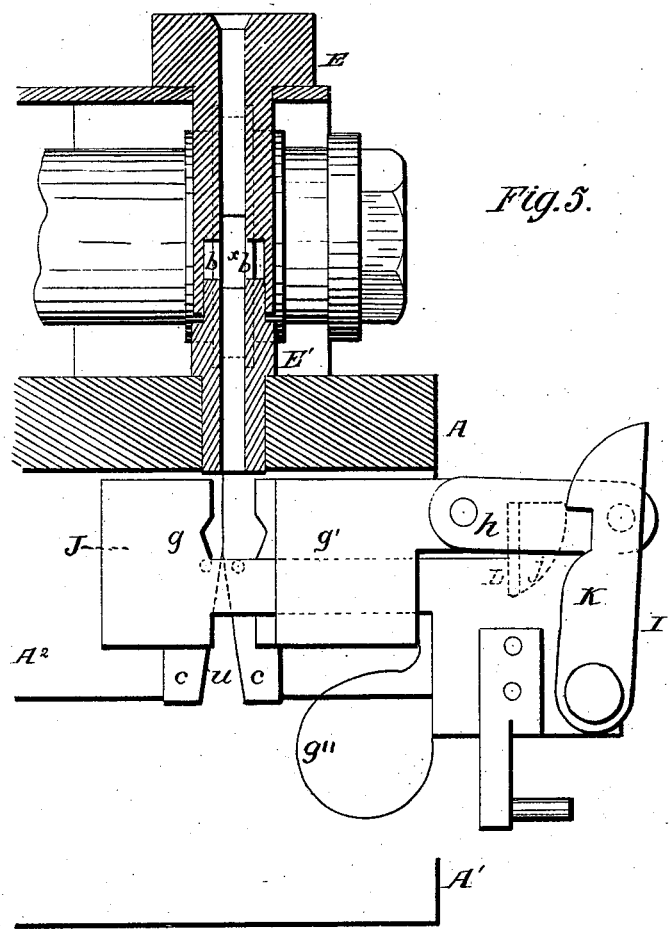
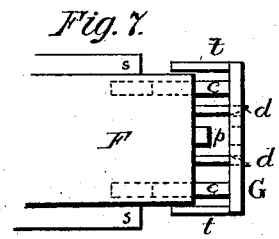
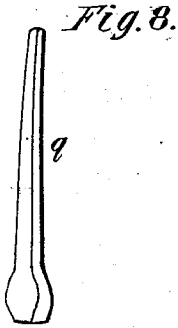
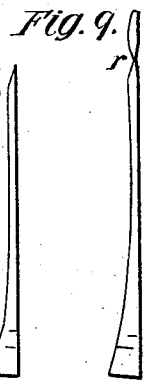
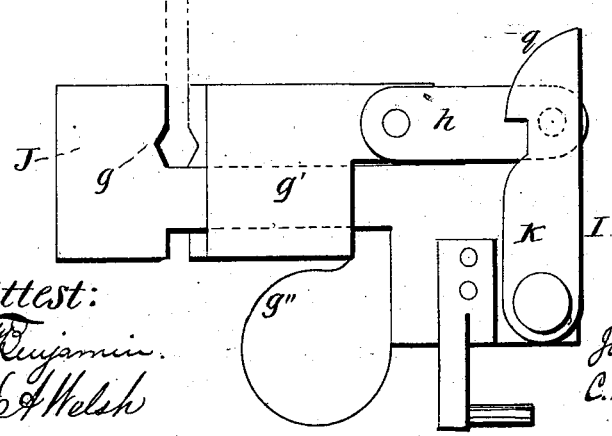

UNITED STATES PATENT OFFICE.

JOB WHYSALL, JR., AND CHARLES M. MERRICK, OF NEW BRIGHTON, PA.

IMPROVEMENT IN MACHINES FOR THE MANUFACTURE OF HORSESHOE-NAILS.

Specification forming part of Letters Patent No. 209,845, dated November 12, 1878; application filed May 11, 1878.

*To all whom it may concern:*

Be it known that we, JOB WHYSALL, Jr., and CHARLES M. MERRICK, of New Brighton, Beaver county, Pennsylvania, have invented Improvements in Manufacture of Horseshoe-Nails, of which the following is a specification:

Our invention has for its object to produce a horseshoe-nail with a beveled point without the wear and injury to the dies and cutters and the liability to misplace the blanks incident to ordinary modes of manufacture, the further object being to facilitate and cheapen the manufacture and afford a better product; and these objects we accomplish by the means hereinafter described, and by apparatus shown in the accompanying drawings, forming part of this specification, in which—

Figure 1:
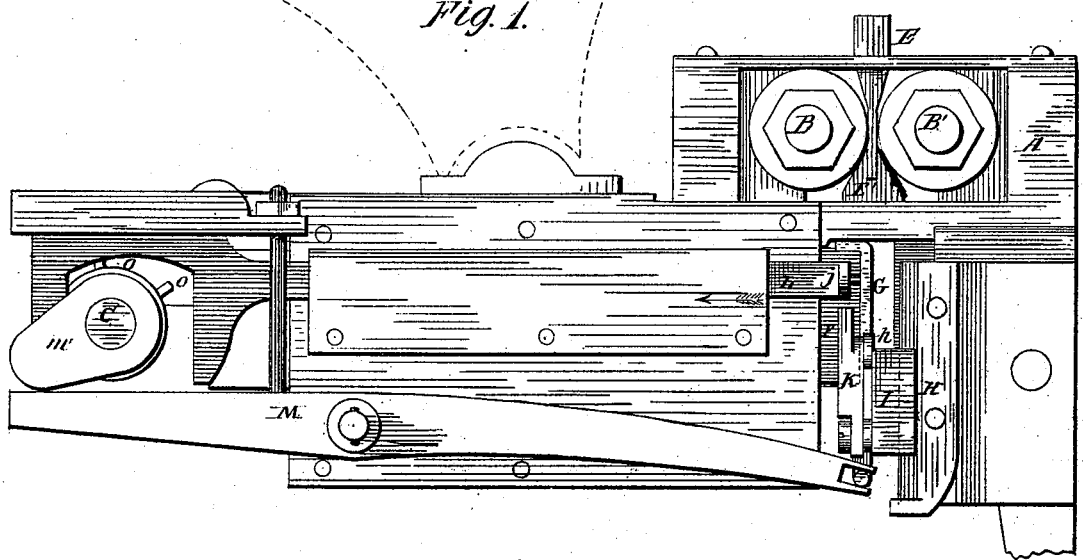
Figure 2:
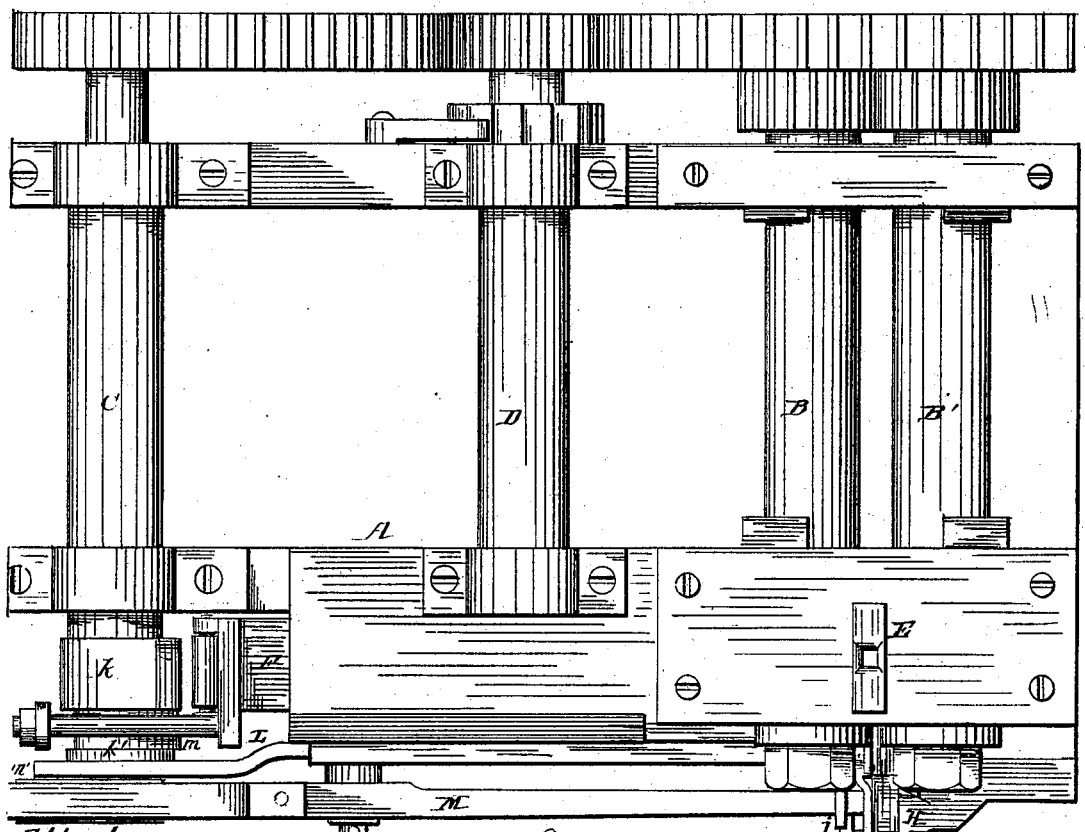

Figure 1 is a side elevation of the apparatus; Fig. 2, a plan view; Fig. 3, a sectional view, showing the dies and cutters; Fig. 4, a detached view of the dies; Fig. 5, a section on the line 1 2, Fig. 3; Fig. 6, a view showing the nail-blank carriage and cutter-plates; Fig. 7, a plan view of the cutter, slide, and stripper; Figs. 8, 9, 10, views showing the different forms of the nail-blanks and finished nail; and Fig. 11, an enlarged view, illustrating the shearing and point-setting operations.

The frame A is constructed in any suitable manner to support the various operating parts of the machine, and has bearings for the roller or die shafts B B′, cam-shaft C, and driving-shaft D. The shafts B B′ are geared together, and a pinion on the shaft D gears with toothed wheels on the shafts B′ and C.

All the shafts may be mounted in bearings admitting of adjustments necessary for the proper operation and regulation of the machine.

Upon the shafts B B′ are the circular dies $a$ $a'$, each having in its periphery a groove, $x$, Fig. 4, with the sides cut away at $y$ $y$ to receive the head of the nail, and gradually decreasing in depth until it is intersected by a double-inclined projection, $x'$, the grooves or recesses $x$ being approximately the same width and depth in each roll.

Into slots in the sides of a removable feed-tube, E, extend the ribs $b$ $b$, at the sides of the grooves $x$ of both dies, the tube being cut away to form arms, which extend downward and embrace the hollow nipple E′, fitting between the dies adapted to a socket in the bed-plate A¹, and forming a continuation of the tube, the said arms insuring the maintenance of both sections of the tube in a line, so that the blanks cannot by any possibility strike against the section E′ in consequence of either section being displaced.

To the cross-piece A² of the frame A are secured, in any suitable manner, cutter-plates $c$ $c$, the adjacent edges of which are beveled for part of their length, forming a ∧-shaped intermediate opening, $u$, the point of which may be at one side of the central line of the rotary dies, as shown in Fig. 5. A slide, F, carrying at the end a detachable ∧-shaped cutter, $p$, Fig. 3, adapted to the space between the cutter-plates $c$ $c$, reciprocates longitudinally between guides of the frame opposite said cutter-plates, and carries a stripper-plate, G, supported by guide-bars $e$ $e$, extending into openings in the end of the slide, Fig. 7.

From the end of the slide F project two pins, $d$ $d$, having beveled ends, as shown in Fig. 7, which extend through the stripper-plate G, and are adapted to openings $f$ $f$, Fig. 6, in the cutter-plates $c$ $c$, on opposite sides of the opening $u$, near the point.

The rearward movement of the stripper G is limited by stop-pins $t$ $t$ coming in contact with stationary portions $s$ of the frame.

On a guide, H, at the side of the frame, reciprocates vertically a carrier, I, having at one side a clamp, J, consisting of a stationary jaw, $g$, and movable jaw $g'$, the adjacent edges recessed to receive between them the head of a nail, Figs. 5 and 6. A spring, $g''$, closes the jaws, and a pivoted arm, K, connected by a link, $h$, to the jaw $g'$, has a beveled end, which, striking a stud, $j$, of a slide, L, reciprocating at the side of the frame, retracts the jaw $g'$. Cams $k$ $k'$ $m$ and pins $o$ impart the required reciprocating movements to the slides F and L, and a rock-lever, M, operated by a cam, $m'$, and connected to the carriage I, imparts to the latter its vertical reciprocation. Any other suitable mechanism may, however, be employed to give the requisite movements to the operative parts of the machine.

The roller-dies are intended to operate upon blanks $q$, formed in any suitable manner by forging, cutting, or otherwise, preferably with the fiber of the iron running longitudinally. By a subsequent operation the head of each blank is reduced to the shape shown at Fig. 8, the shank being slightly narrower and thicker than that of the finished nail. The blank thus or otherwise prepared is introduced into the feed-tube E, so that the head will drop into the recesses $y\ y$ of the dies, Fig. 4, the rotation of which draws down the shank, gradually elongating, thinning, and slightly spreading the same, until the projections $x'\ x'$ indent and bevel it at opposite sides, nearly severing the same, as shown at $r$ in Fig. 9. As the blank is slightly narrower than the recess $x$, it is not wedged therein by the slight spread imparted in rolling; and as the indentation is from both sides, it is not forced into the die, as usual in beveling from one side only, and will therefore deliver freely from both dies, and pass head downward through the lower tube, E', to the clamp J, which is in the elevated position shown in Fig. 5, the nail falling into the jaws, which hold it stationary for an instant. The movement of the slide L in the direction of its arrow, Fig. 1, carries the lug $j$ away from the lever K, and the spring $g''$ closes the jaws of the clamp, while the carrier descends until the indented portion $r$ of the blank is opposite the point of the recess $u$, as shown in Figs. 6 and 11. The forward movement of the slide F brings the pins $e\ e$ on opposite sides of the shank, and, if the blank is not in exact position, centers the same, while the stripper G is carried forward and bears against and holds the blank in place as the cutter advances. As the cutter $p$ passes through the stripper it bears upon the blank and forces the end between the cutting-edges of the plates $c\ c$, shearing the same to a point. The adjustment of the blank is such that the center of the indentation $r$ is opposite the point of the cutters, and the adhesion of the metal as the blank is forced between the plates $c\ c$ by the cutter $p$, Fig. 11, bends the beveled side of the blank opposite the cutter back against the same, as shown in Fig. 11, thereby bringing the bevel wholly to the face of the nail, Fig. 10.

As the slide F recedes the stripper G is carried therewith until the pins $t\ t$ strike the shoulders $s$ on the frame, when the movement of the stripper and slide will be arrested until the carrier ascends for the next blank, when the slide again recedes and the cutter $p$ will be withdrawn through the notch in the stripper, which remains stationary, and the shearing will be carried from the cutter and drop into a receptacle below, the nail dropping from between the plates $c\ c$.

As the slide F is retracted the slide L moves forward, so that as the carrier ascends the lever K is brought into contact with the lug $j$, and the clamp is opened to receive another nail, the slide L being then retracted, as before, to permit the jaws to close. The feed-tube E E', with its passage large enough for the head of the nail, centers the latter between the rolls, keeps it in place, and guides it in a straight course, the sides or ribs $b\ b$ of the dies keeping the shank in line.

The griper J receives the nail as soon as it passes below the bed-plate A¹, moves downward therewith, clamps it, and at the proper time carries it to the proper position opposite the cutting-dies, thus facilitating the removal of the blank expeditiously from the rolls, but retaining the same until the nail is completed by the operation of the cutters.

By these operations a nail is produced with a solid durable head, a condensed point not liable to split, the fiber runs with the length of the nail, and the product is tough, strong, well finished, and durable, while the operations are performed expeditiously without forging, heating the metal, or expensive manipulation.

One of the greatest difficulties heretofore experienced in the manufacture of horseshoe-nails with two rolls has been the adhesion of the blank in the groove into which it is forced in beveling the point, causing the blanks to bend in removal, resulting in the formation of imperfect nails, and causing a rapid deterioration of the dies.

By forming the dies as above described the blank, in place of being forced at this part into a groove, is forced out of the grooves by the projections $x'$, so that there is less tendency to stick and less wear at this point than at any other, while the injury to either dies or blanks from adhesion is impossible.

Where grooved dies have been used the nail-blanks have always been of such proportions that in spreading they would wedge in the dies, with injurious results above referred to. This may be corrected by using dies without grooves; but in such case there is more difficulty in guiding the blanks and in preventing them from taking a curve laterally in rolling. By observing a due proportion of grooves and blanks, as above described, the blanks are rolled straight and without wedging.

In some processes of manufacture where it is not desirable to employ revolving dies, reciprocating dies may be employed to bevel the blanks from opposite sides with like effect.

It will be manifest that this form of die of itself would be of no avail without the subsequent operation, throwing the bevel wholly to one side, and that this operation is most readily performed by the shears, as described. This is not absolutely necessary, however, as the blanks may be pressed or struck between dies to flatten one side, and then sheared.

In ordinary shearing-machines the maladjustment of the blank is a frequent cause of breakage and wear of the cutters, the cutter $p$ being bent or sprung laterally by the improperly-placed blank and by striking the edges of the cutting-plates. By the use of the movable stripper G these results are prevented, first, by the pressure on the blank, which tends to hold it in place as the cutter $p$ moves forward; and, second, by supporting the cutter, which never projects more than one-eighth of an inch beyond the stripper, so that if a blank should get foul, so as to engage but one edge of the cutter, there will not be sufficient elasticity in the very slight projecting portion of the cutter beyond the stripper to permit it to be bent out of line and strike the edges of the die-plates.

As the cutter and stripper recede the shearing is carried away, and prevented from dropping so as to fall on the clamp; but when the latter has been elevated the slide F, by resuming its motion independently of the stripper, causes the shearing to be detached and drop clear of the carriage.

The object in placing the center of the opening $u$ at one side of the center line of the dies is to avoid the necessity of the nice adjustment necessary to clamp the blank exactly on said center line and carry it directly downward, which would render it almost absolutely necessary to make both jaws adjustable. By placing one jaw at one side and in proper position relative to the cutter-plates, it is necessary only to carry the blank by the other jaw to a very slight extent to one side, as described. If it should be desirable, however, the cutters may be arranged directly in line with the dies.

Although we have referred to grooved dies, dies with plain faces—that is, with faces of the shape which would result from cutting away the ribs $b\ b$—may be employed.

We prefer the form shown, however, as the grooves $x$ serve to guide the blank straight in its course.

We claim—

1. The mode described of forming nails with beveled ends by indenting the shank from both sides, and then by the process of shearing setting the point to leave the bevel only on one side, as set forth.

2. The combination, with horseshoe-nail-forming dies, of projections $x'$, arranged across the grooves thereof, to indent the front and back of the flat nail-blank near the point, as set forth.

3. The combination of the forming and drawing rolls, griper, and operating devices, arranged, as described, to receive the blank as it falls from the dies, carry the same to a position opposite the cutter, and hold it until sheared, as set forth.

4. The combination of the rolls, cutter below and at one side the center thereof, and the griper J, reciprocating substantially as set forth.

5. The combination of the reciprocating carriage I, fixed jaw $g$, and movable jaw $g'$, constructed and arranged to carry the nail laterally below the rolls, substantially as and for the purpose set forth.

6. The combination of the reciprocating carriage, its jaws, spring, and lever K, and slide L, having a lug, $j$, substantially as set forth.

7. The combination of the reciprocating cutter $p$, plates $c\ c$, and bevel-ended pins $d\ d$, arranged on opposite sides of the opening between the plates, substantially as and for the purpose set forth.

8. The stripper G, combined and operating with the cutter with a movement independent thereof, substantially as and for the purpose set forth.

9. The combination of the rolls and tube, consisting of the parts E E', one having arms embracing the other, and adapted to receive and conduct the nail-blank, substantially as set forth.

In testimony whereof we have signed our names to this specification in the presence of two subscribing witnesses.

JOB WHYSALL, JR.
C. M. MERRICK.

Witnesses:
BENJ. WILDE,
J. F. MINER.